(12) United States Patent
Fields et al.

(10) Patent No.: US 11,039,522 B1
(45) Date of Patent: Jun. 15, 2021

(54) METHOD, SYSTEM AND COMPUTER READABLE MEDIA FOR THE SYNCHRONIZED ILLUMINATION OF LIGHT SOURCES

(71) Applicant: Eliana J Fields, Lilburn, GA (US)

(72) Inventors: Eliana J Fields, Lilburn, GA (US); Tamim Hanna, Budapest (HU)

(73) Assignee: Eliana J. Fields, Lilburn, GA (US)

( * ) Notice: Subject to any disclaimer, the term of this patent is extended or adjusted under 35 U.S.C. 154(b) by 19 days.

(21) Appl. No.: 16/784,653

(22) Filed: Feb. 7, 2020

(51) Int. Cl.
*H05B 47/12* (2020.01)
*H05B 47/19* (2020.01)
*G10L 25/18* (2013.01)
*G10L 25/51* (2013.01)

(52) U.S. Cl.
CPC .............. *H05B 47/12* (2020.01); *G10L 25/18* (2013.01); *G10L 25/51* (2013.01); *H05B 47/19* (2020.01)

(58) Field of Classification Search
CPC ........ H05B 45/00; H05B 45/10; H05B 45/20; H05B 47/00; H05B 47/10; H05B 47/12; H05B 47/19; G10L 25/18; G10L 25/51
See application file for complete search history.

(56) References Cited

U.S. PATENT DOCUMENTS

| 3,501,628 | A | 3/1970 | Madden |
| 5,461,188 | A | 10/1995 | Drago et al. |
| 5,934,784 | A | 8/1999 | Dion |
| 6,631,723 | B1 | 10/2003 | Mullin |
| 8,689,806 | B2 * | 4/2014 | Tufts ...................... A45D 31/00 132/73 |
| 2009/0293896 | A1 | 12/2009 | Simpson |
| 2018/0158460 | A1 * | 6/2018 | Lee ........................ H05B 47/12 |

* cited by examiner

*Primary Examiner* — Jimmy T Vu

(57) ABSTRACT

A device that comprises a set of light sources such as light emitting diodes and method to control the light sources in accordance with input from a discriminator, which furthermore obtains its input from a signal such as an audio signal. A corresponding system and computer readable storage media are also disclosed.

17 Claims, 11 Drawing Sheets

METHOD, SYSTEM AND COMPUTER READABLE MEDIA FOR THE SYNCHRONIZED ILLUMINATION OF LIGHT SOURCES

CROSS-REFERENCE TO RELATED APPLICATIONS

This application claims the benefit of U.S. Provisional Application No. 62/802,694 filed Feb. 7, 2019, entitled "Synchronizable LED Fashion Accessories" the contents of which are hereby incorporated by reference in their entirety.

FIELD OF THE INVENTION

The present invention relates generally to illuminated products and more specifically to a method, system and computer readable media for synchronized illumination of light sources. Herein one or more accessories such as synchronizable LED Fashion Accessories may be structured and arranged to make it easy to wirelessly synchronize signals such as sounds or music with these LED fashion accessories.

BACKGROUND OF THE INVENTION

In social situations, color may play an important role in communication with and/or perception of an entity. For example, it may be beneficial to adjust color shade of a device in accordance with signals such as sound or music detected in an environment, for example, in an entertainment event space.

One example is the AmbiLight system in which a video signal may be analyzed to generate background color. While such systems may work from a technological point of view, they are limited in flexibility, accuracy and speed.

A fashion accessory which may be considered as an item used to contribute, in a secondary manner, to the wearer's outfit, may often be used to complete an outfit and may be chosen to specifically complement the wearer's look. Said fashion accessory may have the capacity to further express an individual's identity and personality as there are accessories that come in different, shapes, sizes, hues etc. The term came into use in the 20th century.

Fashion accessories may be loosely categorized into two general areas: those that are carried and those that are worn. Traditionally carried accessories include purses and handbags, glasses, hand fans, parasols and umbrellas, wallets, canes, and ceremonial swords. Accessories that are worn may include jackets, boots and shoes, cravats, ties, hats, bonnets, belts and suspenders, gloves, muffs, necklaces, bracelets, watches, sashes, shawls, scarves, lanyards, socks, pins, piercings, rings, and stockings.

The type of accessory that an individual chooses to wear or carry to complement their outfit may be determined by several factors including the specific context of where the individual is going. For example, if an individual is going to work their choice of accessory may differ from one going out for entertainment events.

Various attempts have been made to solve problems found in illuminated products art. Among these are found in: U.S. Pat. No. 5,461,188 to Drago et al.; U.S. Pat. No. 6,631,723 Keith A. Mullin; U.S. Pub. No. 2009/0293896 to Alfred N. Simpson; U.S. Pat. No. 5,934,784 to Larry Dion; and U.S. Pat. No. 3,501,628 to William A. Madden. This prior art is representative of illuminated fashion accessories.

None of the above inventions and patents, taken either singly or in combination, is seen to describe the invention as claimed. Thus, a need exists for a reliable synchronizable LED fashion accessory that is structured and arranged to make it easy to wirelessly synchronize sounds or music with LED fashion accessories in a non-limiting manner and to avoid the above-mentioned problems.

BRIEF SUMMARY OF THE INVENTION

The invention discloses a method, system and computer readable media for synchronized illumination of light sources wherein one or more accessories such as synchronizable LED fashion accessory may be structured and arranged to be easily synchronizable with signals such as sounds or music.

The invention may use a discriminator to accurately process varying frequencies to give the user control of settings and performance of the LED fashion accessory.

Herein a discriminator such as a Fast Fourier Transform (FFT) may be used to analyze incoming signals (e.g. incoming sound patterns) to create corresponding control signals that may be used to control the output of one or more light sources (such as the luminous intensities of Light Emitting Diodes (LEDs), color of LEDs, as well as settings and/or one or more modes of the LED fashion accessory or of the light sources of the LED fashion accessory), in a manner wherein the output(s) of the one or more light sources is/are synchronized with the incoming signals. Herein, for example, low frequency components (bass) of incoming sound patterns may produce a difference output from the output produced by high frequency and mid frequency components of the incoming sound pattern.

In an aspect of the present invention, a synchronization system may communicate with one or more accessory devices (trinkets) outfitted with LEDs to react to software programming that enables a user to fully customize the behavior of the LEDs in relation to sound. Specifically, the accessory device may communicate with a software module such as an application via a computer system such as a mobile device to allow the user to control how the accessory device works with sound. Light intensity of the accessory device may be controlled, and an application may be employed to share on social media and purchase other accessory devices to sync with. Each accessory device may work independently through communication with its corresponding configuration terminal via a synchronization system or may work in conjunction with other accessory devices through the employment of a master configuration terminal.

In another aspect herein, the accessory device is a printed circuit board (PCB), such as a flexible PCB, though not required, that is configured to receive electrical components such as a Bluetooth chip, rechargeable battery, LEDs, and LED drivers. The accessory device may communicate with an application to provide customization of the behavior of the accessory device. Information such as device settings may be communicated between the application and the accessory device. The accessory device may also have a usb port to provide a way to recharge the battery of the device.

In an embodiment of the present invention, the accessory device may receive data directly from an external network source instead of from a discriminator output. Herein, for example, the output of FFT component may be discarded.

In another embodiment of the present invention, an network such as an external network or a button may be used to trigger color animations in the accessory device or to trigger an emergency mode, in which the flashing of the colors may no longer be determined by the FFT, but rather by information stored on the device or on another data store for emergency mode color information.

Further, in another exemplary embodiment the local and network driven color generation may be extended to include an Application Program Interface (API) wherein third-party systems may enslave the accessory devices of users to transmit messages. The messages may be related to, for example, relationship status, the presence of like-minded cigar smokers, etc.

Moreover, the accessory device may have a mechanical, electric, electromechanical or other embedded device such an electric motor that generates vibrations and vibrates upon receiving instructions from a notification module of a computer system of the present invention, in order to, for example, notify a user about new information.

In an embodiment of the invention, the accessory device may be a trinket and may include one or more of Sunglasses, Sunglass Cases, Fitness equipment, LED Stripes, Dancing poles, Swimming Pool accessories Billard accessories, Lighting, Hair accessories, Nail art, Pet accessories, Headphones, Stage and venue lighting, Fashion accessories, Roller skate and roller blade wheels, Interior and Exterior Automobile lighting, Ashtray, Smoking water pipes, Bongs, Phone accessories, Hats, Glow sticks, Jewelry boxes, Dental accessories, Indoor/outdoor signage, Wall and floor panels, Costume jewelry, High end jewelry, Christmas/Holiday lights, Indoor ambiance lighting, Table top center pieces, Footwear, Candles, Body Jewelry, Suspenders, Bracelets, E-Sports Accessories, Meditation/Spa Room lightling, Crocs Accessories, Fashion Pin, Yacht/Boat Interior/Exterior Lighting, Water sport vehicle accessories, Microphones and the like.

Advantages of the invention may include the ability to synchronize with a plurality of accessory devices for an immersive user experience. Moreover, users may be provided with pre-set lighting options but may utilize fully customizable light synchronization. Further, the invention may provide a safety feature for finding persons that are lost in the dark and may transition from being used as a wearable technology to event lighting an event space in such a way that the user and their environment interact together.

In an aspect herein a method of synchronizing a trinket with a configuration terminal is disclosed, the method comprising: obtaining an audio sample for a predefined duration of time in the form of electrical signals from an audio device, said audio sample corresponding to sound in an environment; using a discriminator to determine one or more individual components of the audio sample that correspond to predefined threshold levels of sound intensity; determining one or more mode values for controlling a trinket light source in response to each determined one or more individual components of said audio sample, said determination is based on user defined or preset mode values; sending instructions containing information about the one or more mode values to the trinket through a communications system; and updating a property of the trinket light source based on the instructions that contain the information about said one or more mode values.

In another aspect of the present invention, the method may include one or more combinations of the following: (i) wherein each individual component of the one or more components is a frequency component and the discriminator generates a Fast Fourier Transform to obtain said frequency component from a corresponding frequency spectrum, (ii) wherein the frequency component is a peak frequency component corresponding to a frequency of maximum power or wherein the frequency component is a band of frequencies, (iii) wherein the frequency component is a single frequency, (iv) wherein the one or more mode values are color values or intensity values of the trinket light source, (v) wherein the trinket light source includes one or more of Red Green Blue Light Emitting Diodes (RGB LEDs), Organic Light Emitting Diodes (OLEDs), lasers, gas discharge tubes, lightbulbs, nixie tubes and other configurable light sources that allow a property of said other configurable light sources to be changed in an electric manner, (vi) wherein another one or more mode values are determined for controlling another one or more other trinkets in response to each determined one or more individual components in order to create a unified stage lighting effect in which a plurality of trinkets are synchronized to the configuration terminal, and wherein the configuration terminal is a master configuration terminal, (vii) wherein the one or more other trinkets are controlled by the master configuration terminal through their respective configuration terminals and (viii) wherein the instructions are sent wirelessly.

In yet another aspect of the present invention, a system for synchronizing a trinket with a configuration terminal, may be provided, the system comprising: a discriminator in communication with a configuration terminal; a trinket in communication with a discriminator system of the discriminator, through a communications system, and a processor configured to: obtain an audio sample for a predefined duration of time in the form of electrical signals from an audio device, said audio sample corresponding to sound in an environment; use the discriminator to determine one or more individual components of the audio sample that correspond to predefined threshold levels of sound intensity; determine one or more mode values for controlling a trinket light source of the trinket in response to each determined one or more individual components of said audio sample, said one or more mode values are determined based on user-defined or preset mode values; send instructions containing information about the one or more mode values to the trinket through a communications system; and update a property of the trinket light source based on the instructions that contain the information about said one or more mode values.

In even yet another embodiment of the present invention, the system may include one or more combinations of the following systems: (i) wherein the communications system is a wireless communications system, (ii) wherein each individual component of the one or more components is a frequency component and the discriminator is configured to generate a Fast Fourier Transform to obtain said frequency component from a corresponding frequency spectrum, (iii) wherein the one or more mode values are color values or intensity values of the trinket light source, (iv) wherein the trinket light source includes one or more of Red Green Blue Light Emitting Diodes (RGB LEDs), Organic Light Emitting Diodes (OLEDs), lasers, gas discharge tubes, lightbulbs, nixie tubes and other configurable light sources that allow a property of said other configurable light sources to be changed in an electric manner, (v) wherein the processor is further configured to determine another one or more mode values for controlling another one or more other trinkets in response to each determined one or more individual components in order to create a unified stage lighting effect in which a plurality of trinkets are synchronized to the configuration terminal, and wherein the configuration terminal is a master configuration terminal, and (vi) wherein the processor is further configured to cause the master configuration terminal to control the one or more other trinkets through their respective configuration terminals.

In an even further aspect of the present invention, a non-transitory computer-readable storage medium may be provided. The non-transitory computer readable medium may store a program which, when executed by a computer system, causes the computer system to perform a procedure comprising: obtaining an audio sample for a predefined duration of time in the form of electrical signals from an audio device, said audio sample corresponding to sound in an environment; using a discriminator to determine one or more individual components of the audio sample that correspond to predefined threshold levels of sound intensity; determining one or more mode values for controlling a trinket light source in response to each determined one or more individual components of said audio sample, said determination is based on user defined or preset mode values; sending instructions containing information about the one or more mode values to the trinket through a communications system; and updating a property of the trinket light source based on the instructions that contain the information about said one or more mode values.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The invention may, however, be embodied in many different forms and should not be construed as being limited to the embodiments set forth herein; rather, these embodiments are provided by way of illustration only and so that this disclosure will be thorough, complete and fully convey understanding to those skilled in the art.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein and wherein.

Figure 1:
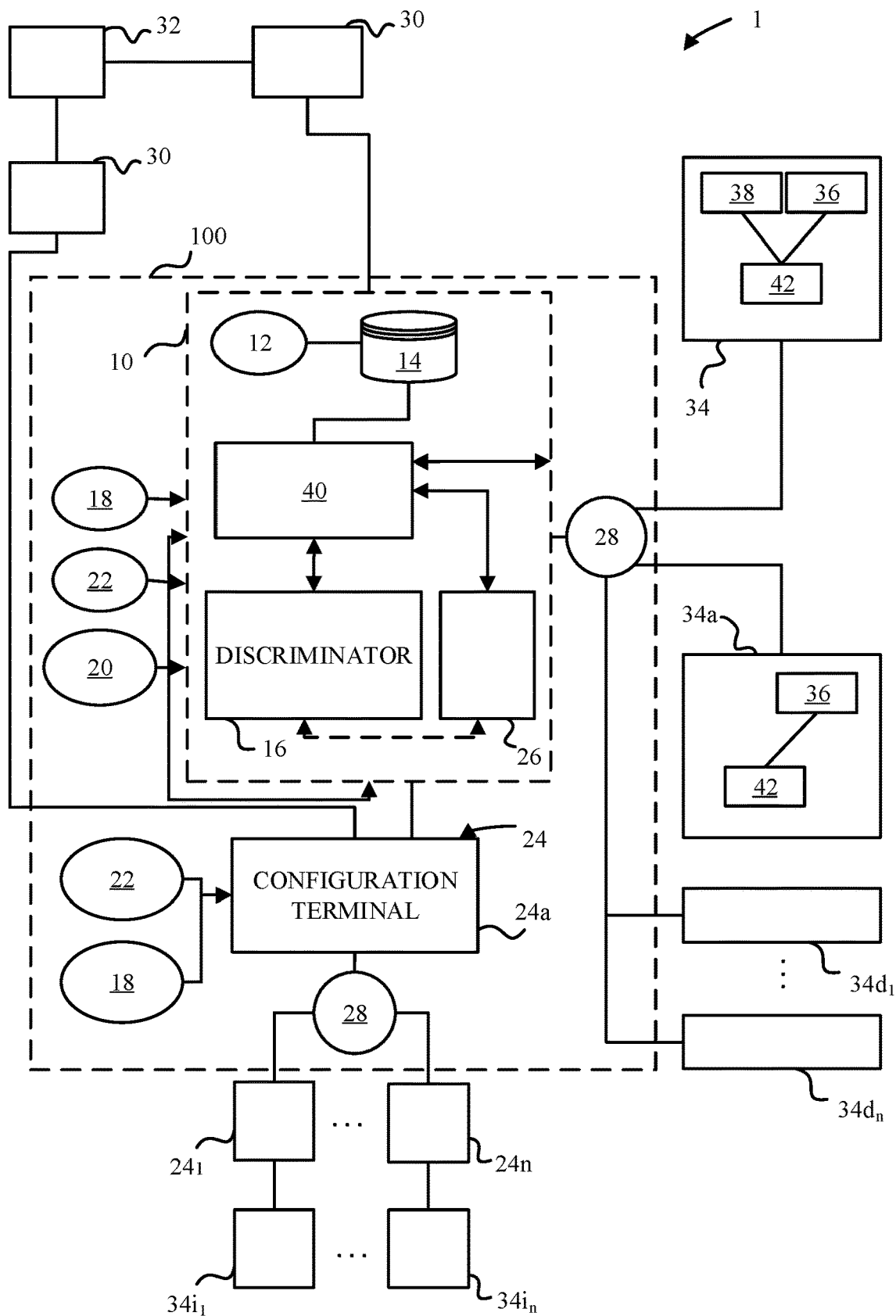
FIG. 1 is a high-level block diagram of a synchronization system according to an exemplary embodiment of the present invention.

Different ones of the figures may have at least some reference numerals that may be the same in order to identify the same components, although a detailed description of each such component may not be provided below with respect to each Figure.

DETAILED DESCRIPTION OF THE INVENTION

The features and principles of the present invention will now be described relative to exemplary embodiments thereof. It will be apparent to those skilled in the art that numerous variations or modifications may be made to the exemplary embodiments without departing from the spirit and scope of the present invention. The system and method are not limited to the specific embodiments described herein. Components of each system and method can be practiced independently and separately from other components and methods. Each system and method also can be used in combination with other components and methods.

In accordance with example aspects described herein, a method, system and computer readable storage media for the synchronized illumination of light sources are disclosed. One or more synchronizable LED Fashion Accessories may be structured and arranged to be easily synchronizable with signals such as sounds or music wherein a temporal correlation between signals and modes of the LED Fashion Accessories may be created.

"MACHINE-READABLE MEDIUM" as used herein may refer to a component, device or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

"MODULE" as used herein may refer to logic having boundaries defined by function or subroutine calls, branch points, application program interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" may be a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules may become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time. Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" may refer to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a desktop, "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API) for third parties). The performance of certain of the operations may be distributed among the processors, not only residing within a single machine, but deployed across a number of machines. In some example embodiments, the processors or processor-implemented modules may be located in a single geographic location (e.g., within an entertainment even space, a home, an office environment etc.).

"PROCESSOR" as used herein may refer to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously. It may also be a microprocessor or a microcontroller.

Device and System for the Synchronized Illumination of Light Sources

The invention relates to an accessory device, hereinafter referred to as a trinket 34 (or fashion LED accessory) and a system/synchronization system 1 as shown in FIG. 1. The system/synchronization system 1 may comprise one or more of said trinkets 34 and a computer system 100. The trinket 34 may include one or more light sources 36 (preferably RGB LED light sources that may be configurable to display a plurality of colors, but may be other light sources such as organic light emitting diodes, lasers, gas discharge tubes, lightbulbs, nixie tubes and/or otherwise other configurable light sources that allow a property such as a color, mode, and intensity of the light source to be changed) and the synchronization system 1 may control the LEDs of the light sources 36 in accordance with input from a discriminator 16 of a discriminator system 10, which furthermore may obtain its input from an audio signal 18 such as electrical signals from a microphone or directly from an audio source's digital data. Herein, the discriminator may be a device or software module that is configured to convert a property of an input signal into an amplitude. It may analyze an audio sample and transform it into a frequency distribution. This can usually be done preferably via an FFT, but may also be achieved by other means such as by the use of an RF (mixer) or analog (filter chain) applications.

Figure 2:
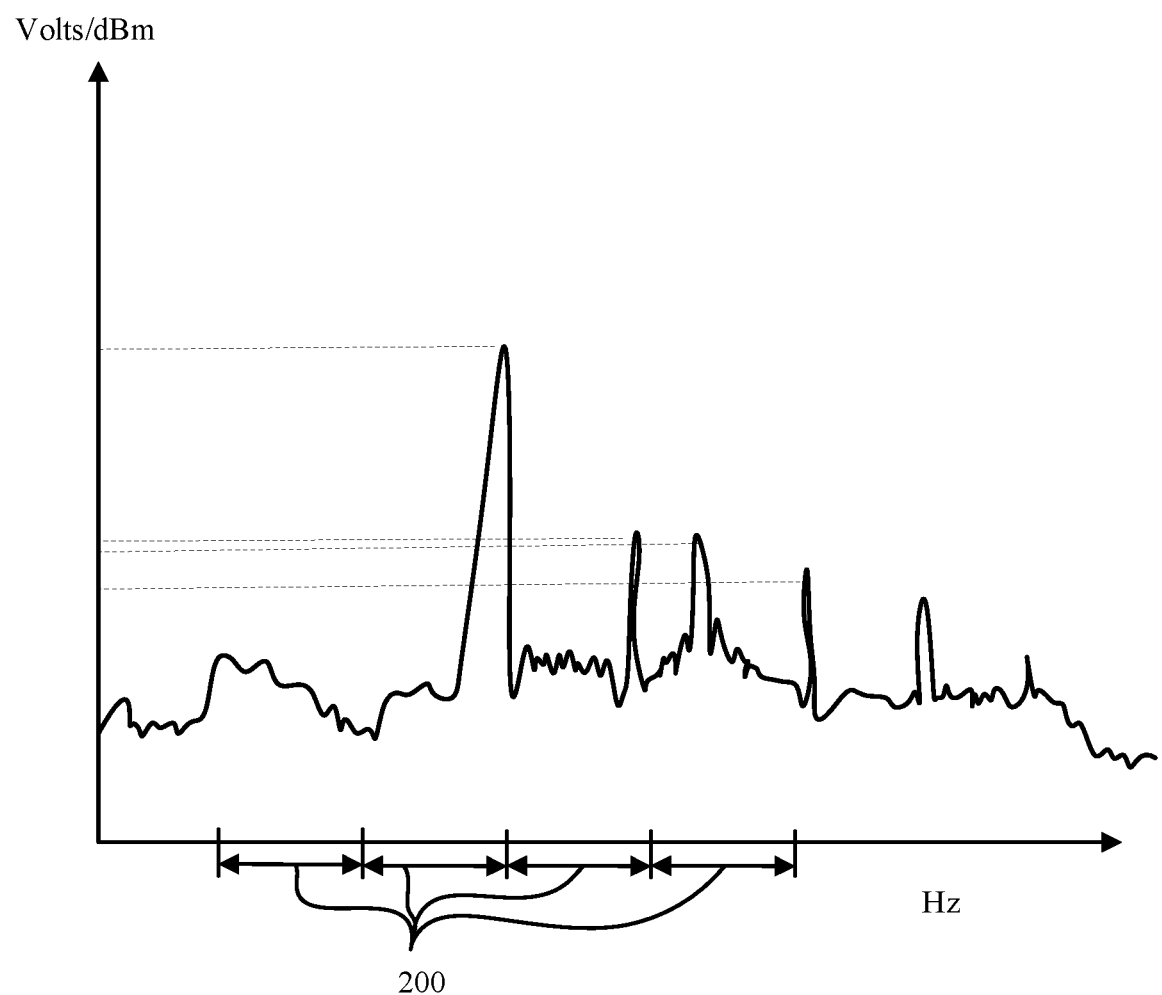
FIG. 2 is a graph showing a Fast Fourier Transform (FFT) spectrum according to an exemplary embodiment of the present invention.

This system 1 may contain an implementation of a discriminator 16 such as a Fast Fourier Transform (FFT), which may detect audio peak frequency distribution for a predefined time period, as shown in FIG. 2, for example. Said audio peak frequency may provide a best estimate of pitches of the audio signals. This may produce an entire spectral "snapshot" per signal sample, so that multiple peaks inside of the FFT may be determined. The process is then repeated for the next signal sample. The discriminator 16 may be in electrical communication with a processor 40 that is configured to perform discriminator analysis or otherwise FFT analysis on incoming signals. The processor 40 may achieve this by loading corresponding instructions such as instructions corresponding to FFT analyses stored in a non-transitory storage device in the form of computer-readable program instructions and execute the loaded instructions.

A spectral output of the discriminator 16 may be fed into a look up table of a look up module 26 that contains user defined and/or predetermined (pre-set) trinket color/intensity/mode value-to-frequency mappings for the trinket 34. Herein, one or more defined frequency bands 200 (shown in FIG. 2) of the spectral output may be obtained and corresponding intensities such as voltages or decibel-milliwatts (dBm) of each band may be measured, such that if the measured value exceeds a predetermined threshold value, instructions for controlling the light source according to the band's properties (such as frequency) may be relayed to the display engine 42 of the trinket 34, through the communication system 28, preferably concurrently or substantially concurrently (in real time). The discriminator 16 may be configured such that levels or tones of sound such as bass, treble, mid are the determined through, for example, the use of the FFT, and ambient sound/noise are ignored. In an exemplary embodiment of the present invention, a user may define in a configuration terminal/application 24 (said configuration terminal may in an exemplary embodiment be a hardware and/or software module) a trinket color/mode value of "Red" for a band frequency value of 15 GHz or range of values (bandwidth) of 14-16 GHz. The band frequency value or range of values may also have a pre-defined trinket color/mode value of "Blue". Herein, the user defined value may override the preset value and may be used as part of the instructions for controlling the light source 34.

Different modes and settings for the control of the light sources 36 (e.g. LEDs) may exist in the configuration terminal/application 24 wherein a preset modes and settings may be available for a user as well as the ability to customize the modes and settings for each trinket 34 of a user. Further, the system may be configured such that new trinkets 34 may synchronizable with previous and/or future trinkets 34 through the use of the configuration terminal/application 24 in communication with a database such as local settings 14 of the discriminator system 10 or any other database in the synchronization system 1, wherein information concerning access to corresponding trinkets 34 of the configuration terminal/application 24 may be stored.

Of course, it will be clear to a person of ordinary skill how to achieve other configurations in light of this specification.

One trinket may be configured differently from another to achieve the requirements of that trinket. For example, a trinket 34 that may initiate communication with a discriminator system 10 may have a button 38 for initiating said communication, while another trinket 34*a* that does not need to initiate said communication may not have said button 38.

Information needed for the controlling the discriminator system, such as user defined input that are stored may be stored in a database such as a local settings database 14. Moreover, the local settings database may be accessed by a setting application 12.

In addition, the system 1 may also comprise a configuration terminal 24 such as a software application that permits the adjusting of the modes such as colors or luminous intensities of the light sources 36. Of course the terminal may alternatively be a hardware module configured to adjust the luminous intensities of the light sources 36.

In some embodiments of the present invention, the configuration terminal may be a main/master configuration terminal 24*a* wherein the master configuration terminal 24*a* may control one or more of a number "n" dependent trinkets $34d_1$-$34d_n$ that are configured to receive instructions from the master configuration terminal 24*a*. Alternatively the master configuration terminal 24*a* may enslave/commandeer (and thus be in communication with) one or more other configuration terminals/applications $24i_1$-$24i_n$ corresponding to independent trinkets $34i_1$-$34i_n$ and may thus control the independent trinkets $34i_1$-$34i_n$ through their respective other configuration terminals and/or other discriminator systems. Herein the master configuration terminal 24*a* be used to create a unified stage effect wherein multiple devices may be synchronized with one another or to an external source. For example, at a concert, processors of configuration terminals of users may be adapted to receive instructions from the master configuration terminal and may be enslaved to a processor of the master configuration terminal, which may transmit commands/a command sequence to the entire fleet of terminals. Thus, the drum (not shown) of a drummer may have a microphone or audio sensor that records the beating of the drum, wherein said recorded beating of the drum may be used by a discriminator of a main configuration terminal of the drummer in order to control the lighting of trinkets of all concert-goers. Communications means such as, but not limited to low power, low data rate wireless ad hoc networks or visible light communications may be used.

The master configuration terminal 24*a* may also receive audio signals 18 and/or user input 22 from an input device, such as from a button in the system 1 or on the trinket 34, and may send light pattern information to trinkets through a communication system 28 that is preferably wireless, for example through Bluetooth Low Energy (LE), Long range (LoRa) low-power wide-area network and/or otherwise a wireless communication system. Audio signals 18 and/or user input 22 may alternatively be sent directly to the discriminator system 10. In an embodiment, the system 1 may use Bluetooth, NFC (Near Field Communication), and radio frequency to communicate with a configuration terminal 24.

During operation, the terminal frequently monitors its surroundings and its input, and may adjust the output of the LEDs accordingly, temporarily or permanently.

The discriminator system 10 may be a part of the computer system 100 or may be separate from the computer system.

In an embodiment of the present invention, network instructions such as color and light intensity sequences from a network module 20 may alternatively be used to control the trinket 34. Said network instructions may, in one exemplary embodiment, bypass the discriminator 16 and control the trinket 34 through the communication system 28. Herein a change logic of the discriminator system 10 may be configured to accept preprocessed input such as from the network module 20 or from an API 30 and provide corresponding output to the trinket 34. It may also be configured to accept input from a button in order to trigger an emergency flashing mode of the trinket 34. Further the discriminator system 10 may be configured to accept input from surrounding trinkets through the communication system 28. In a further embodiment, the discriminator may be disposed directly on the trinket, eliminating the need for a configuration terminal/application 24.

In another exemplary embodiment, said network instructions may not bypass the discriminator 16.

An Application Programming Interface (API) 30 may be provided for relaying third party instructions to a configuration terminal/application 24 or directly to the trinket 34 through the discriminator system 10. Herein the discriminator 10 may or may not be used. Third-party applications 32 may therefore control one or more trinkets through the API 30 and or transmit messages to the users' surroundings. For example, a stock trading application may flash a user's trinket in response to large profits or losses made in an automatic stock trading transaction.

In another aspect, instead of an FFT, RC elements tuned to various pass bands may be used for the discriminator. Moreover, a filter chain may be used wherein RC filtering may be performed in software and then the results of each filter band are obtained.

Computer System for the Synchronized Illumination of Light Sources

Figure 3:
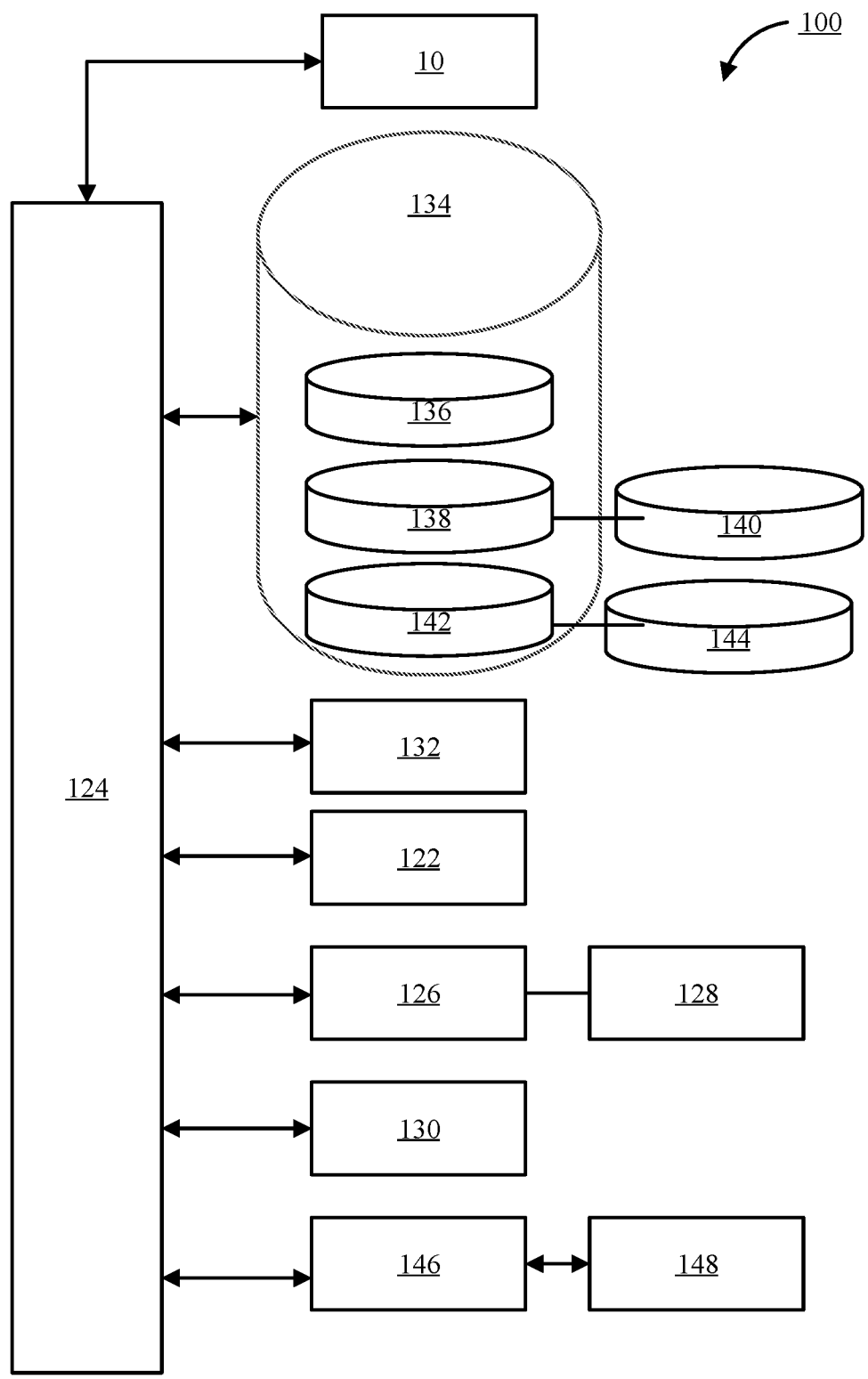
FIG. 3 is a block diagram of a computer system according to an exemplary embodiment of the present invention.

Having described the trinket 34 and system 1 FIG. 1 reference will now be made to FIG. 3, which shows a block diagram of a computer system 100 that may be employed in accordance with at least some of the example embodiments herein. Although various embodiments may be described herein in terms of this exemplary computer system 100, after reading this description, it may become apparent to a person skilled in the relevant art(s) how to implement the invention using other computer systems and/or architectures.

The computer system 100 may include or be separate from the synchronization system 1 of FIG. 1. The computer system may also include at least one computer processor 122 such as the processor 40 of FIG. 1, a user interface 126 and an input unit 130. The input unit 130 such as finger, stylus etc., in one exemplary embodiment may be used along with a display unit 128 such as a smartphone screen, touchscreen device or monitor to configure and control the lighting of the trinket 34. Such configurations may be used to override pre-set configurations. The input unit 130 may alternatively be a gesture recognition device, a trackball, a mouse or other input device such as a keyboard. In one example, the display unit 128, the input unit 130, and the computer processor 122 may collectively form the user interface 126.

The computer processor 122 may include, for example, a central processing unit, a multiple processing unit, an application-specific integrated circuit ("ASIC"), a field programmable gate array ("FPGA"), a microcontroller or the like. The processor 122 may be connected to a communication infrastructure 124 (e.g., a communications bus, or a network). In an embodiment herein, the processor 122 may receive a request for creating a light pattern based on incoming audio signals and may determine an FFT for samples of the audio signal and create corresponding instructions for one or more trinkets based on the output from a look-up table of the loop-up module 26. The processor 122 may achieve this by loading corresponding instructions stored in a non-transitory storage device in the form of computer-readable program instructions and executing the loaded instructions. Moreover, the discriminator system 10 may be a part of the computer system 100 or may be separate from said computer system 100.

The computer system 100 may further comprise a main memory 132, which may be a random-access memory ("RAM") and also may include a secondary memory 134. The secondary memory 134 may include, for example, a hard disk drive 136 and/or a removable-storage drive 138. The removable-storage drive 138 may read from and/or write to a removable storage unit 140 in a well-known manner. The removable storage unit 140 may be, for example, a floppy disk, a magnetic tape, an optical disk, a flash memory device, and the like, which may be written to and read from by the removable-storage drive 138. The removable storage unit 140 may include a non-transitory computer-readable storage medium storing computer-executable software instructions and/or data.

In further alternative embodiments, the secondary memory 134 may include other computer-readable media storing computer-executable programs or other instructions to be loaded into the computer system 100. Such devices may include a removable storage unit 144 and an interface 142 (e.g., a program cartridge and a cartridge interface); a removable memory chip (e.g., an erasable programmable read-only memory ("EPROM") or a programmable read-only memory ("PROM")) and an associated memory socket; and other removable storage units 144 and interfaces 142 that allow software and data to be transferred from the removable storage unit 144 to other parts of the computer system 100.

The computer system 100 also may include a communications interface 146 which may be a part of or may be separate from the communications system 28 of FIG. 1. Said communications interface 146 may enable software and data to be transferred between the computer system 100 and external devices such as the trinket 34. Such an interface may include Bluetooth, Bluetooth Low Energy (LE), Long range (LoRa) low-power wide-area network, visible light communications, Zigbee, a modem, a network interface (e.g., an Ethernet card, a wireless interface, a cloud delivering hosted services over the internet, etc.), a communications port (e.g., a Universal Serial Bus ("USB") port or a FireWire® port), a Personal Computer Memory Card International Association ("PCMCIA") interface, and the like. Software and data transferred via the communications interface 146 may be in the form of signals, which may be electronic, electromagnetic, optical or another type of signal that may be capable of being transmitted and/or received by the communications interface 146. Signals may be provided to the communications interface 146 via a communications path 148 (e.g., a channel). The communications path 148 may carry signals and may be implemented using wire or cable, fiber optics, a telephone line, a cellular link, a radio-frequency ("RF") link, or the like. The communications interface 146 may be used to transfer software or data or other information between the computer system 100 and a remote server or cloud-based storage.

One or more computer programs or computer control logic may be stored in the main memory 132 and/or the secondary memory 134. The computer programs may also be received via the communications interface 146. The computer programs may include computer-executable instructions which, when executed by the computer processor 122, cause the computer system 100 to perform some or all of the methods described herein.

In another embodiment, the software may be stored in a non-transitory computer-readable storage medium and loaded into the main memory 132 and/or the secondary memory 134 of the computer system 100 using the removable-storage drive 138, the hard disk drive 136, and/or the communications interface 146.

Implementation of other hardware and software arrangements so as to perform the functions described herein will be apparent to persons skilled in the relevant art(s) in view of this description.

Method for the Synchronized Illumination of Light Sources

Figure 4:
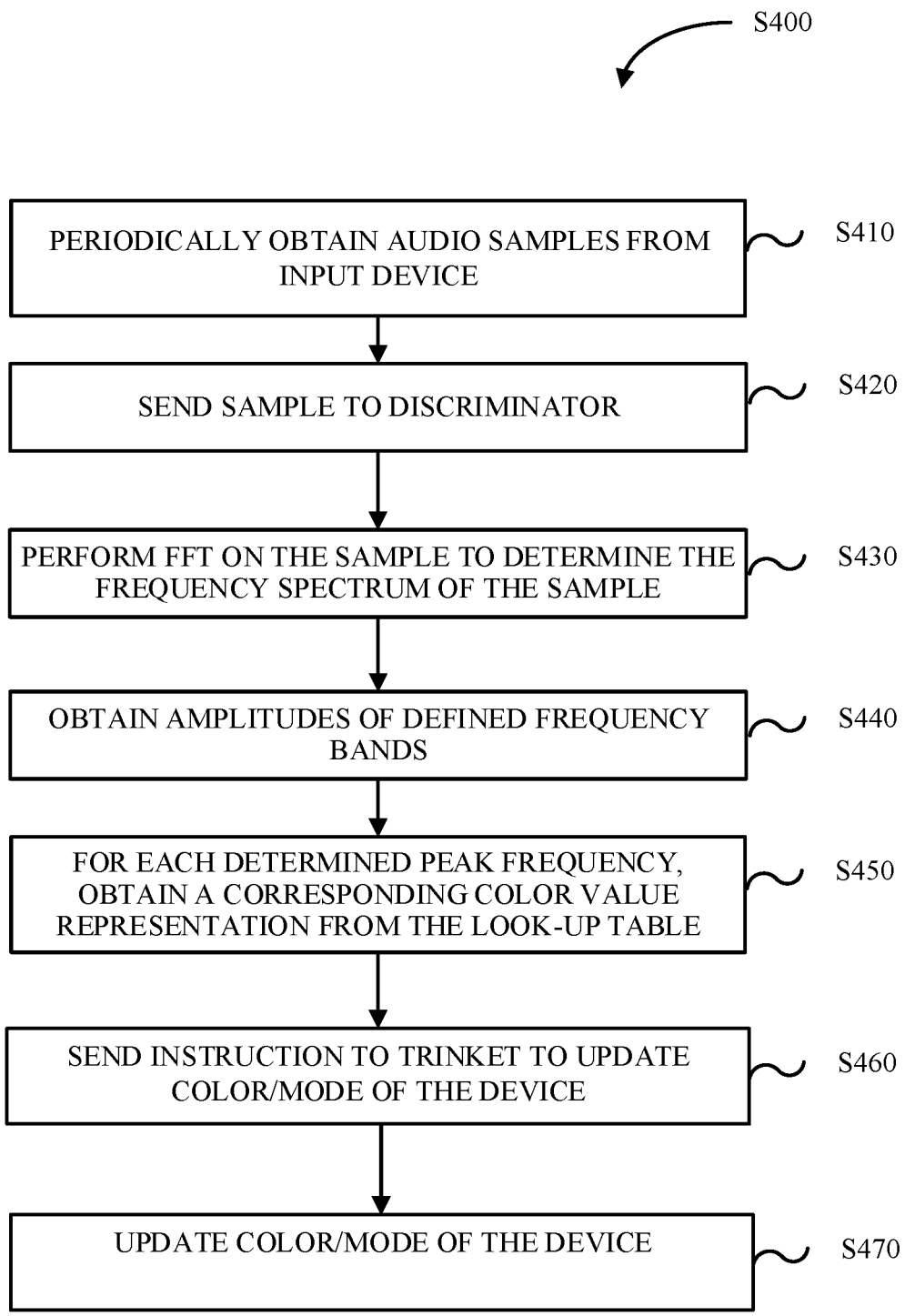
FIG. 4 is a flowchart illustrating a method according to an exemplary embodiment of the present invention.

Having described the computer system 100 FIG. 3 reference will now be made to FIG. 4, which shows an exemplary process S400 that may be employed in accordance with at least some of the example embodiments herein.

The process may begin at Step S410 wherein audio samples may be obtained periodically from a microphone or an audio source of the synchronization system 1. For each audio sample, the sample may be fed into the discriminator 16 in Step S420.

In Step S430, a Fast Fourier Transform may be performed on the audio sample to determine the frequency spectrum of the sample. After determining the transform, the amplitudes/intensities of defined bands (such as in Volts or dBm) may be obtained in Step S440 in order to determine the peak frequencies. This may be carried out such that bands whose amplitudes do not exceed or fit in preferably predefined thresholds for the corresponding band may be ignored. Bands whose amplitudes fit in said predefined threshold may be obtained as peak frequencies or peak frequency bands.

For the determined peak frequencies, a corresponding trinket mode/color value may be retrieved from a look-up table (Step S450) and corresponding instructions for lighting up one or more trinkets 34 may be sent to the one or more trinkets 34 through the communications system 28 in Step S460. Upon receiving the display engine/processor 42 of the trinket may interpret the instructions and activate the light source 36 according to said interpreted instructions (Step S470).

Figure 5:
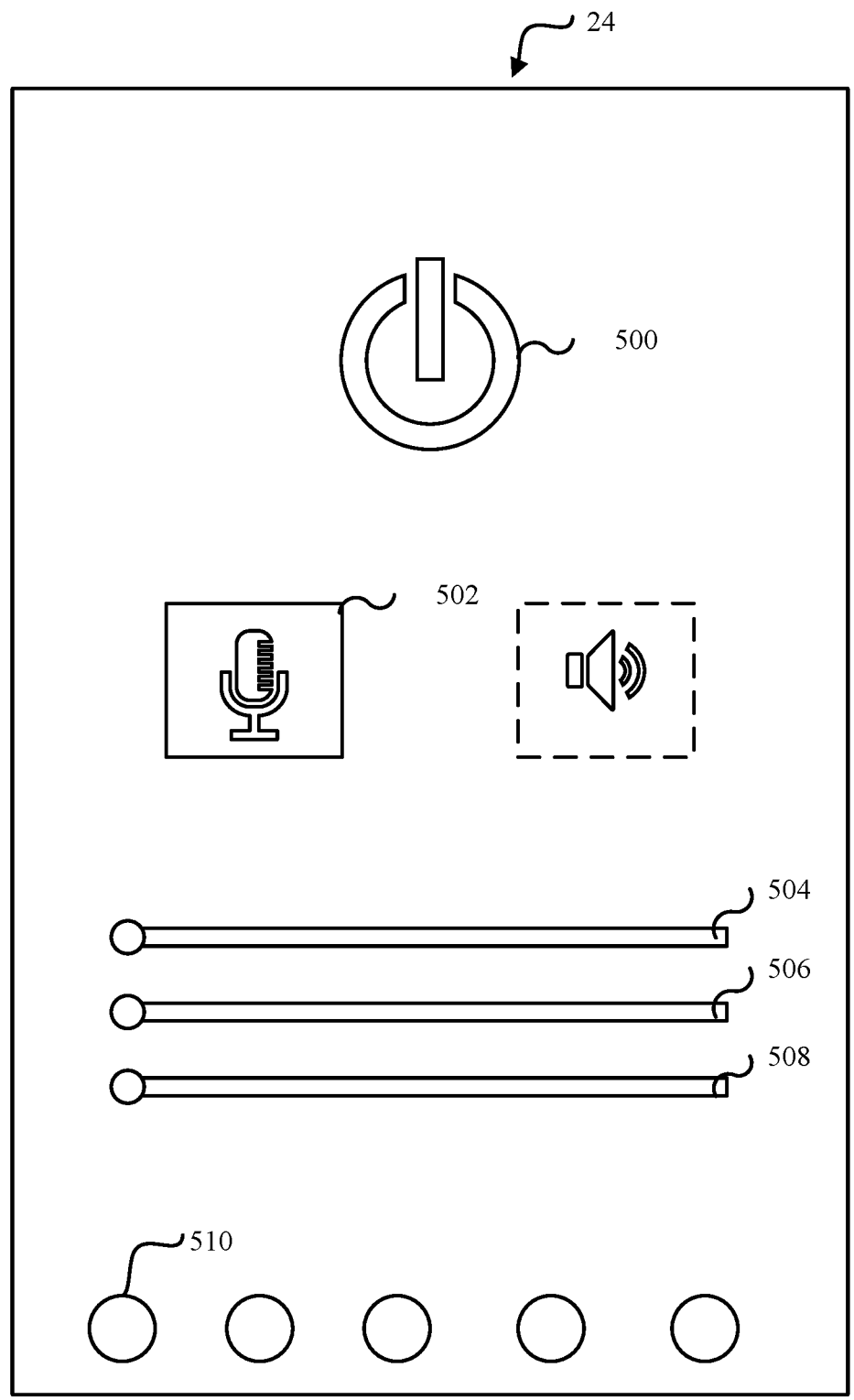
FIG. 5 is sketch showing a mobile device display according to an embodiment of the present invention.
Figure 6:
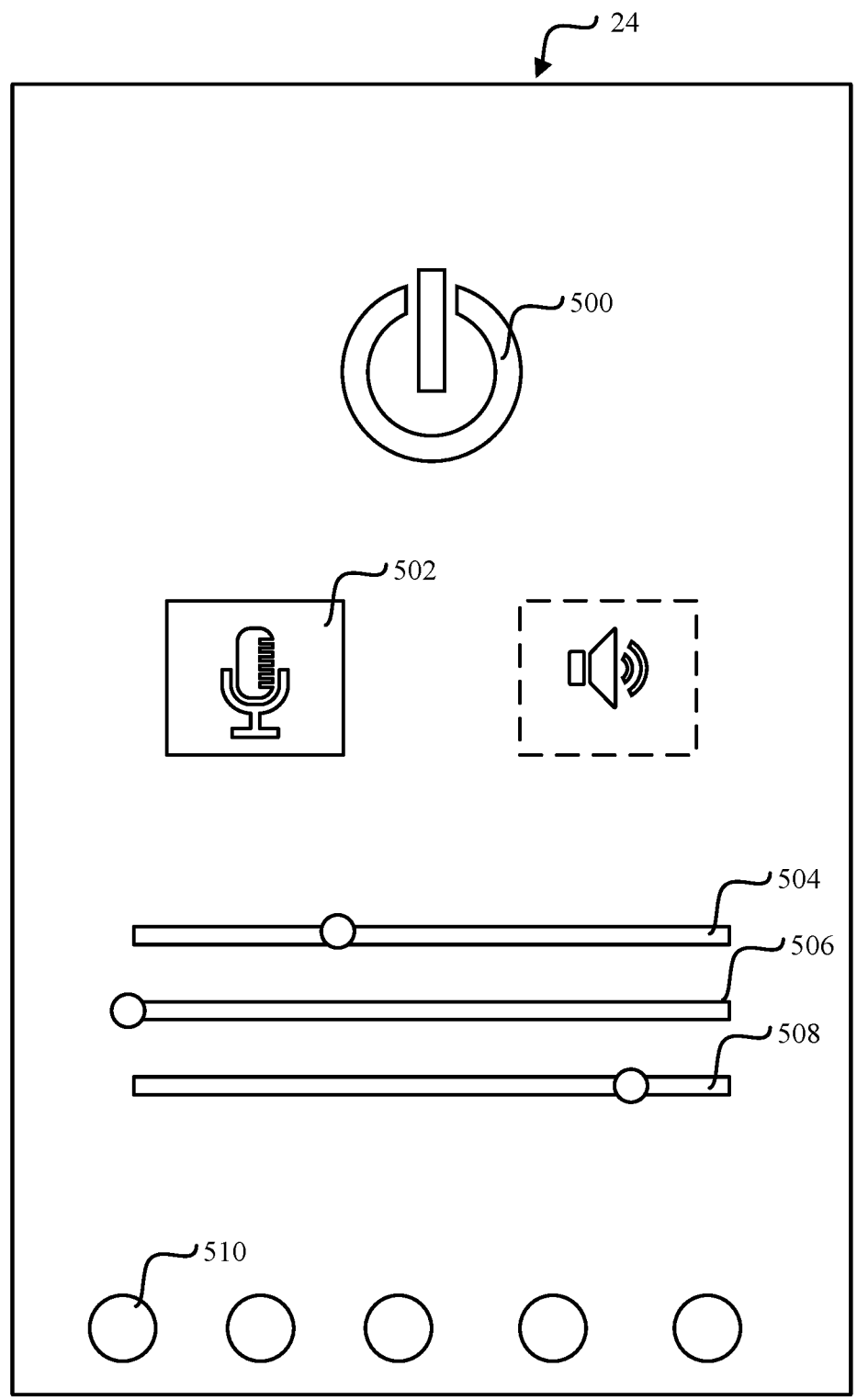
FIG. 6 is another sketch showing a mobile device display according to an embodiment of the present invention.

FIG. 5-11 may further illustrate the use of a configuration terminal 24 of a mobile device in controlling corresponding trinkets 34. In FIG. 5, a user may be shown a screen that may contain virtual elements for use in controlling a physical device. The virtual elements may include but may not be limited to color scales such as a treble color scale 504, a mid-tone color scale 506, a base color scale 508. Said virtual elements may also include a Bluetooth/wireless screen button 510 and a customize sound options button 500.

The treble color scale 504 may be used to choose a visible color for a trinket 34 that may be synchronized with the configuration terminal 24, when treble sounds in the environment are observed based on calculations done by the discriminator 16. The mid-tones color scale 506 may be used to choose a visible color for the trinket 34, when mid-tone sounds in the environment are observed based on calculations done by said discriminator 16. Similarly, the bass color scale 508 may be used to choose a visible color for the trinket 34, when bass sounds in the environment are observed based on calculations done by said discriminator 16.

In order to begin listening for audio in a user's environment, the user may click on a microphone icon 502 which may activate a microphone of the mobile device which may contain a transducer that may convert sounds into an electrical signal.

Figure 7:
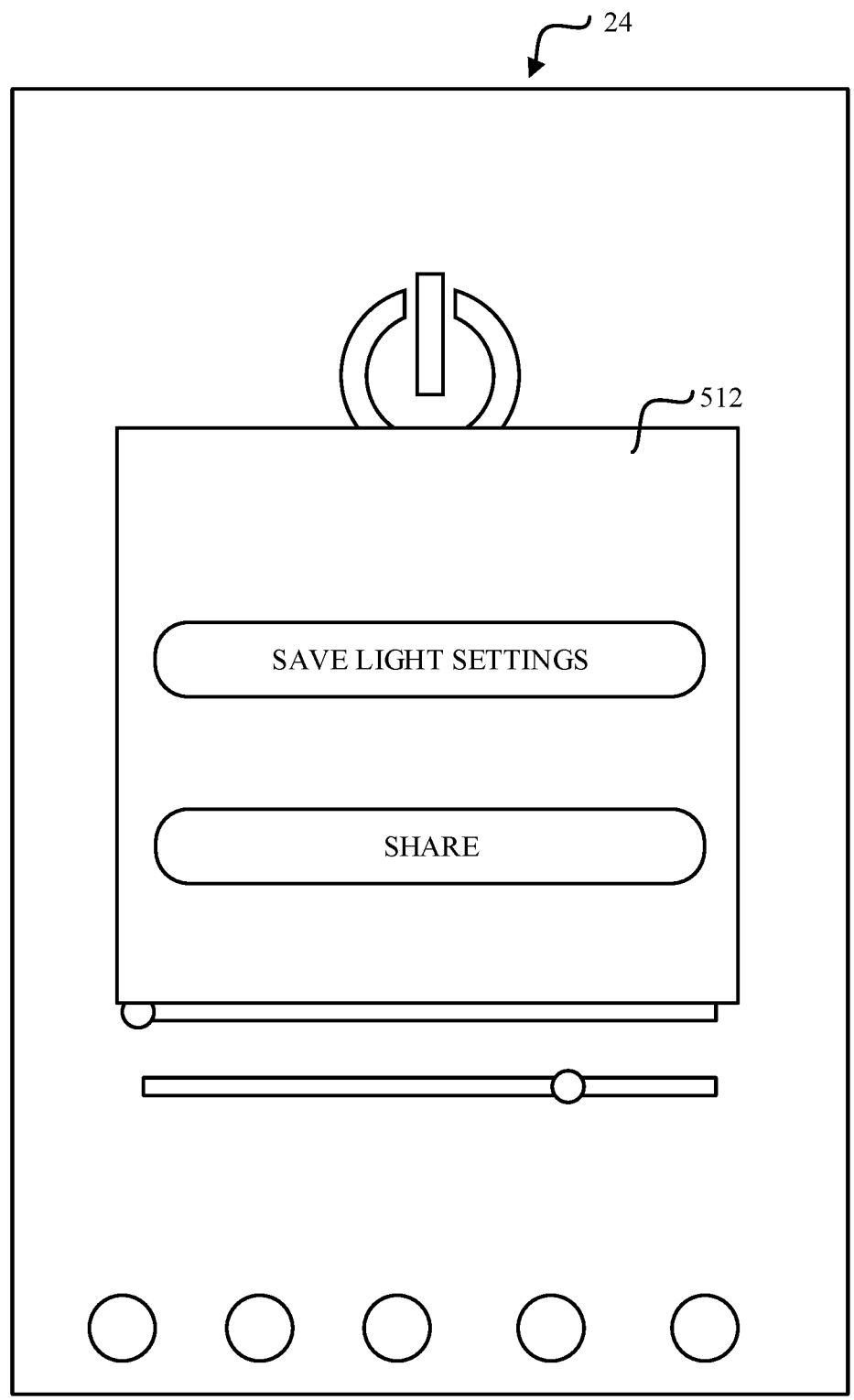
FIG. 7 is another sketch showing a mobile device display according to an embodiment of the present invention.

Upon clicking on the customize sound options button 500, the color scales may be activated and made available for configuration (FIG. 6), wherein sliding of the virtual color scale over a defined range may correspond to choosing a color display for a physical trinket. Corresponding light settings may then be saved as shown in FIG. 7.

Figure 8:
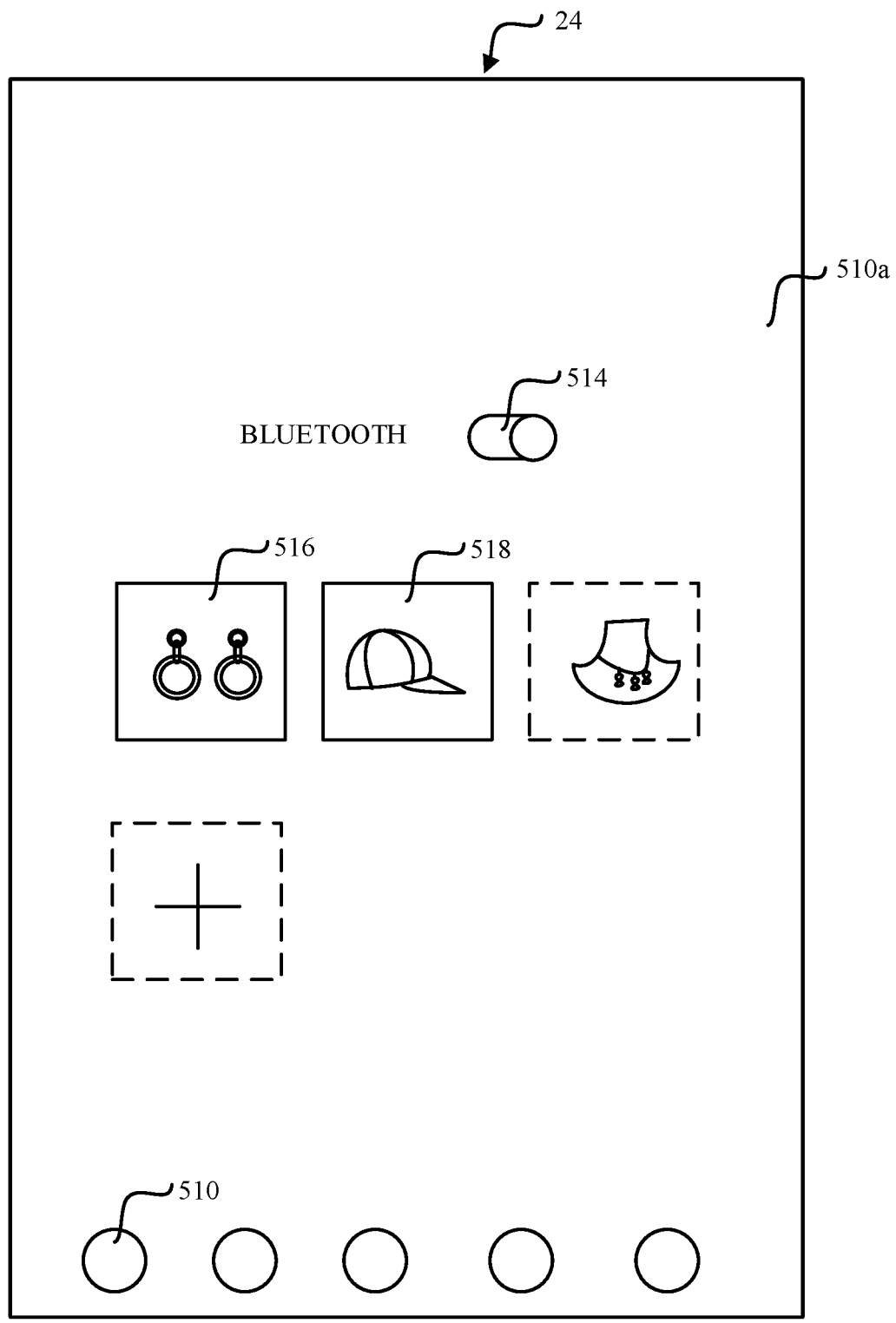
FIG. 8 is another sketch showing a mobile device display according to an embodiment of the present invention.
Figure 9:
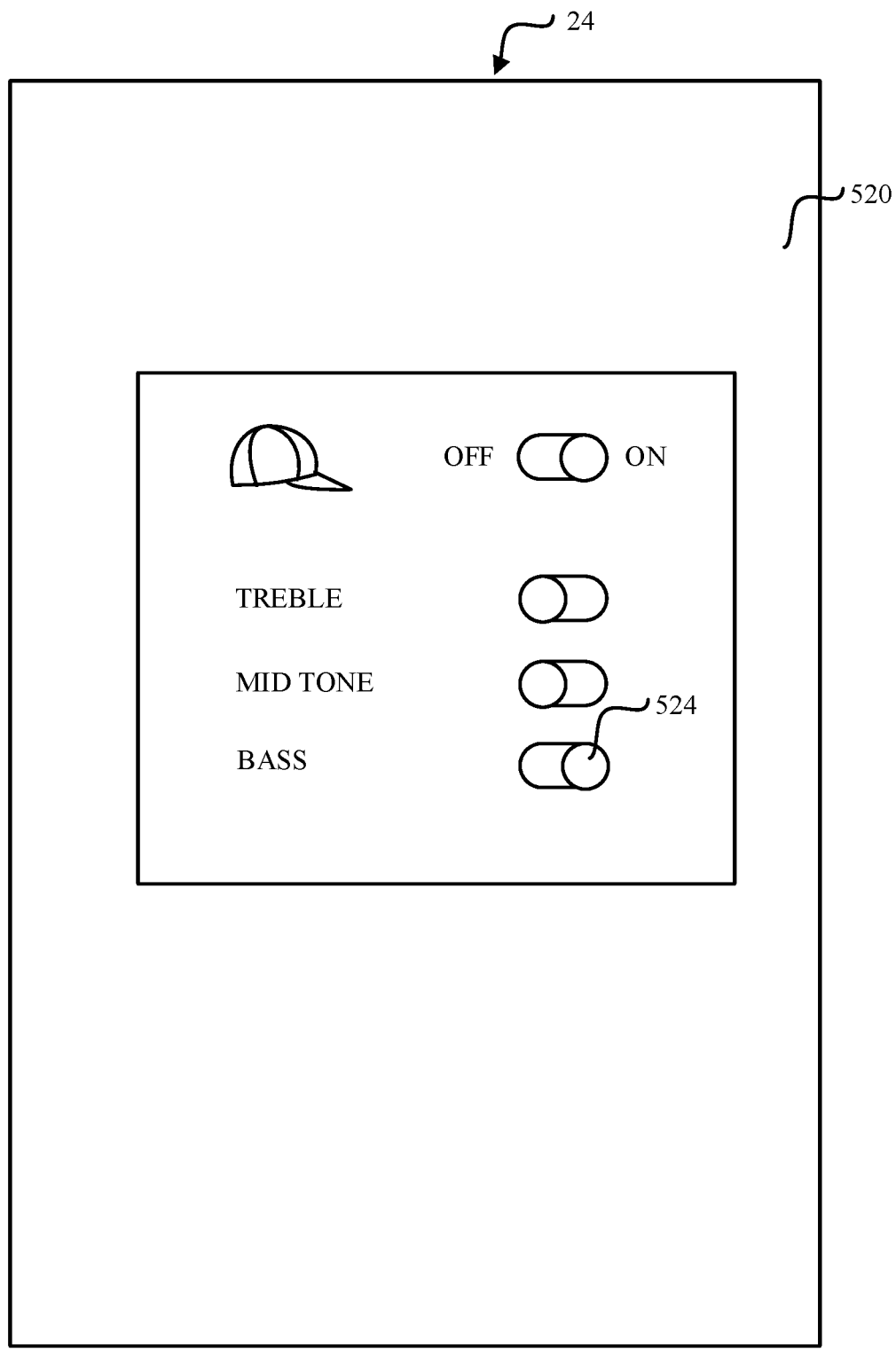
FIG. 9 is another sketch showing a mobile device display according to an embodiment of the present invention.
Figure 10:
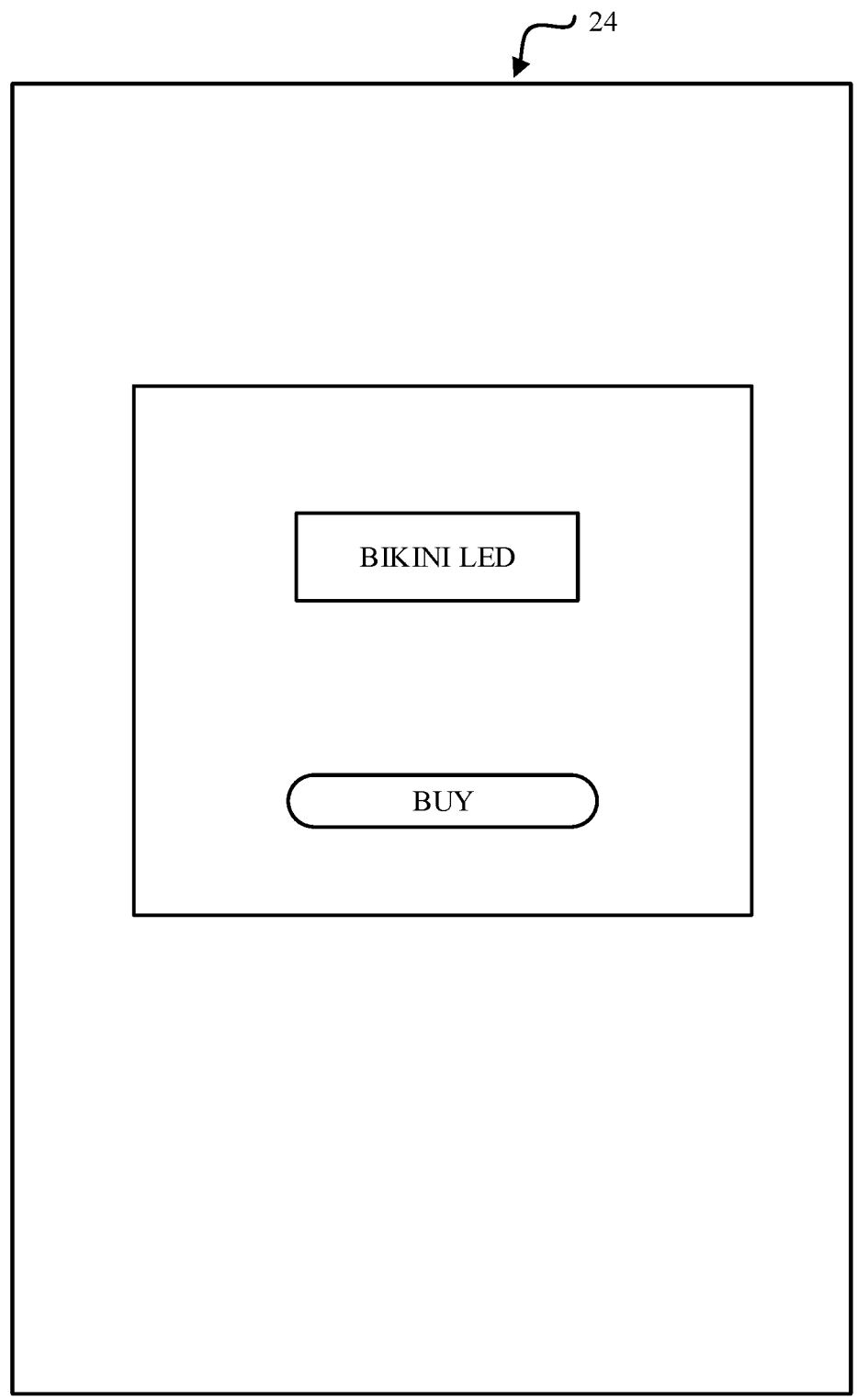
FIG. 10 is another sketch showing a mobile device display according to an embodiment of the present invention.
Figure 11:
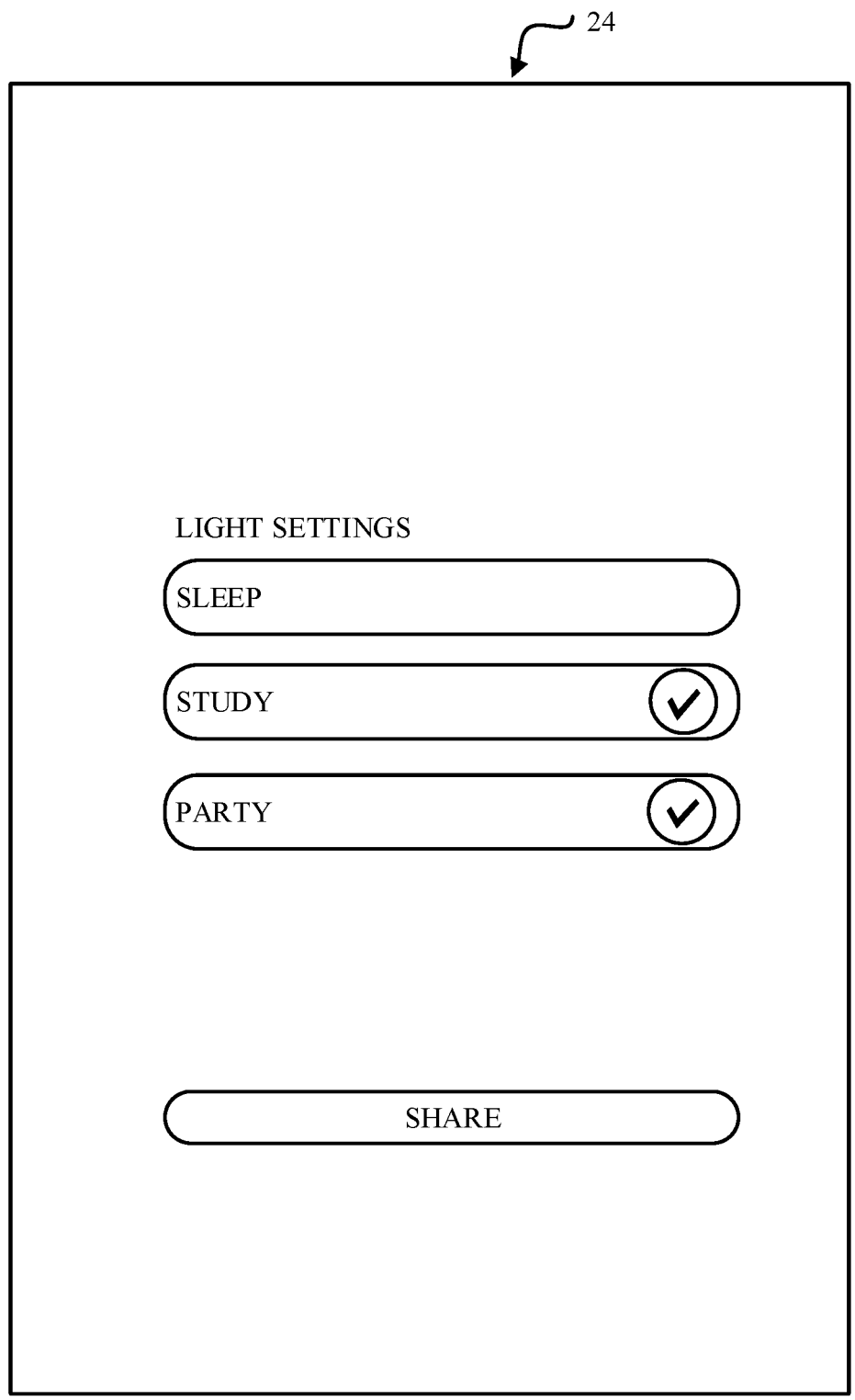
FIG. 11 is another sketch showing a mobile device display according to an embodiment of the present invention.

In order to choose trinkets 34 that may be connected to the configuration terminal 24, a Bluetooth/wireless screen button 510 may be clicked to bring up a Bluetooth screen 510a (FIG. 8). A corresponding Bluetooth button 514 may be turned on to activate wireless communications and one or more trinket buttons 516, 518 corresponding to one or more physical trinkets may be added and/or clicked to bring up a trinket screen 520 for configuration. Said trinket screen 520 may have means for activating and/or deactivating one or more tones through a tone activation/deactivating button 524. Herein, the corresponding physical trinket may respond to the activated tone. Further, the configuration terminal may provide the ability to buy other trinkets and/or share trinket settings as is shown in FIGS. 10-11.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiment or enumerated variation. Many modifications, variations and other embodiments will come to the minds of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

What is claimed is:

1. A method of synchronizing a trinket with a configuration terminal, the method comprising:
    obtaining an audio sample for a predefined duration of time in the form of electrical signals from an audio device, said audio sample corresponding to sound in an environment;
    using a discriminator to determine one or more individual components of the audio sample that correspond to predefined threshold levels of sound intensity at predefined frequency bands;
    determining one or more mode values for controlling a trinket light source in response to each determined one or more individual components of said audio sample, said determination is based on user defined or preset mode values;
    sending instructions containing information about the one or more mode values to the trinket through a communications system; and
    updating a property of the trinket light source based on the instructions that contain the information about said one or more mode values.

2. The method according to claim 1, wherein each individual component of the one or more components is a frequency component and the discriminator generates a Fast Fourier Transform to obtain said frequency component from a corresponding frequency spectrum.

3. The method according to claim 2, wherein the frequency component is a peak frequency component corresponding to a frequency of maximum power or wherein the frequency component is a band of frequencies.

4. The method according to claim 2, wherein the frequency component is a single frequency.

5. The method according to claim 1, wherein the one or more mode values are color values or intensity values of the trinket light source.

6. The method according to claim 1, wherein the trinket light source includes one or more of Red Green Blue Light Emitting Diodes (RGB LEDs), Organic Light Emitting Diodes (OLEDs), lasers, gas discharge tubes, lightbulbs, nixie tubes and other configurable light sources that allow a property of said other configurable light sources to be changed in an electric manner.

7. The method according to claim 1, wherein another one or more mode values are determined for controlling another one or more other trinkets in response to each determined one or more individual components in order to create a unified stage lighting effect in which a plurality of trinkets are synchronized to the configuration terminal, and wherein the configuration terminal is a master configuration terminal.

8. The method according to claim 7, wherein the one or more other trinkets are controlled by the master configuration terminal through their respective configuration terminals.

9. The method according to claim 1, wherein the instructions are sent wirelessly.

10. A system for synchronizing a trinket with a configuration terminal, the system comprising:
a discriminator in communication with a configuration terminal;
the trinket in communication with a discriminator system of the discriminator, through a communications system, and
a processor configured to:
obtain an audio sample for a predefined duration of time in the form of electrical signals from an audio device, said audio sample corresponding to sound in an environment;
use the discriminator to determine one or more individual components of the audio sample that correspond to predefined threshold levels of sound intensity at predefined frequency bands;
determine one or more mode values for controlling a trinket light source of the trinket in response to each determined one or more individual components of said audio sample, said one or more mode values are determined based on user-defined or preset mode values;
send instructions containing information about the one or more mode values to the trinket through a communications system; and
update a property of the trinket light source based on the instructions that contain the information about said one or more mode values.

11. The system according to claim 10, wherein the communications system is a wireless communications system.

12. The system according to claim 10, wherein each individual component of the one or more components is a frequency component and the discriminator is configured to generate a Fast Fourier Transform to obtain said frequency component from a corresponding frequency spectrum.

13. The system according to claim 10, wherein the one or more mode values are color values or intensity values of the trinket light source.

14. The system according to claim 10, wherein the trinket light source includes one or more of Red Green Blue Light Emitting Diodes (RGB LEDs), Organic Light Emitting Diodes (OLEDs), lasers, gas discharge tubes, lightbulbs, nixie tubes and other configurable light sources that allow a property of said other configurable light sources to be changed in an electric manner.

15. The system according to claim 10, wherein the processor is further configured to determine another one or more mode values for controlling another one or more other trinkets in response to each determined one or more individual components in order to create a unified stage lighting effect in which a plurality of trinkets are synchronized to the configuration terminal, and wherein the configuration terminal is a master configuration terminal.

16. The system according to claim 15, wherein the processor is further configured to cause the master configuration terminal to control the one or more other trinkets through their respective configuration terminals.

17. A non-transitory computer-readable storage medium storing a program which, when executed by a computer system, causes the computer system to perform a procedure comprising:
obtaining an audio sample for a predefined duration of time in the form of electrical signals from an audio device, said audio sample corresponding to sound in an environment;
using a discriminator to determine one or more individual components of the audio sample that correspond to predefined threshold levels of sound intensity at predefined frequency bands;
determining one or more mode values for controlling a trinket light source in response to each determined one or more individual components of said audio sample, said determination is based on user defined or preset mode values;
sending instructions containing information about the one or more mode values to a trinket through a communications system; and
updating a property of the trinket light source based on the instructions that contain the information about said one or more mode values.

* * * * *